(12) United States Patent
Sparks

(10) Patent No.: US 11,035,593 B2
(45) Date of Patent: Jun. 15, 2021

(54) VERTICAL HEAT EXCHANGER FOR A GEOTHERMAL HEATING AND COOLING SYSTEM AND METHOD OF USE

(71) Applicant: Robert Louis Sparks, Pagosa Springs, CO (US)

(72) Inventor: Robert Louis Sparks, Pagosa Springs, CO (US)

(*) Notice: Subject to any disclaimer, the term of this patent is extended or adjusted under 35 U.S.C. 154(b) by 0 days.

(21) Appl. No.: 16/404,089

(22) Filed: May 6, 2019

(65) Prior Publication Data
US 2020/0080751 A1    Mar. 12, 2020

Related U.S. Application Data

(60) Provisional application No. 62/728,532, filed on Sep. 7, 2018.

(51) Int. Cl.
*F24T 10/17* (2018.01)
*F24T 50/00* (2018.01)
*F24T 10/00* (2018.01)

(52) U.S. Cl.
CPC .............. *F24T 10/17* (2018.05); *F24T 50/00* (2018.05); *F24T 2010/53* (2018.05)

(58) Field of Classification Search
CPC . F24T 10/15; F24T 10/17; F24T 50/00; F24T 2010/53; F28D 20/0052
See application file for complete search history.

(56) References Cited

U.S. PATENT DOCUMENTS

2008/0289795 A1*  11/2008  Hardin ............... F24T 10/15
                                                     165/45
2010/0326623 A1*  12/2010  Azzam ............... F24T 10/00
                                                     165/45

(Continued)

FOREIGN PATENT DOCUMENTS

CA     3041447 A1     5/2018
EP     1853789 A1    11/2007

(Continued)

OTHER PUBLICATIONS

English Machine Translation to Abstract EP3115713.

(Continued)

*Primary Examiner* — Devon Russell
(74) *Attorney, Agent, or Firm* — Cantor Colburn LLP

(57) ABSTRACT

A ground source heat exchanger (110) is described herein, The ground source heat exchanger (110) including: a first fluid conduit (112), the first fluid conduit having a first arcuate configuration with a first plurality of separate passages (114) extending therethrough; a second fluid conduit (116), the second fluid conduit having a second arcuate configuration with a second plurality of separate passages (118) extending therethrough; and an end cap (120) secured to a distal end (122) of the first fluid conduit and a distal end (124) of the second fluid conduit, wherein the end cap fluidly couples the first plurality of separate passages of the first fluid conduit to the second plurality of separate passages of the second fluid conduit, wherein the first fluid conduit and the second fluid conduit when secured to the end cap define an internal cavity (126) extending through the ground source heat exchanger.

13 Claims, 10 Drawing Sheets

(56) References Cited

U.S. PATENT DOCUMENTS

| | | | | |
|---|---|---|---|---|
| 2011/0232795 A1* | 9/2011 | Hardin | ............ | F16L 9/006 |
| | | | | 138/111 |
| 2011/0272054 A1* | 11/2011 | Yang | ............ | F28D 20/0052 |
| | | | | 138/149 |
| 2013/0112368 A1* | 5/2013 | Koenig | ............ | F16L 9/006 |
| | | | | 165/45 |
| 2013/0175002 A1* | 7/2013 | Leonard | ............ | F24T 10/15 |
| | | | | 165/45 |
| 2013/0181369 A1* | 7/2013 | Porter | ............ | F24T 10/13 |
| | | | | 264/150 |
| 2017/0328651 A1* | 11/2017 | Rozga | ............ | H05B 3/42 |
| 2018/0023903 A1* | 1/2018 | Mutou | ............ | F28F 9/0229 |
| | | | | 165/175 |
| 2019/0285292 A1* | 9/2019 | Roppelt | ............ | F28D 20/0043 |

FOREIGN PATENT DOCUMENTS

| | | | | |
|---|---|---|---|---|
| EP | 3115713 A1 | 1/2017 | | |
| JP | 2006234340 A | * | 9/2006 | ............ F28F 1/022 |
| KR | 101868074 B1 | 6/2018 | | |

OTHER PUBLICATIONS

English Machine Translation to Abstract KR101868074.
International Search Report for Application No. PCT/US2019/049956.
ISR/WO, dated Nov. 7, 2019, VXH0001PCT.
Written Opinion for Application No. PCT/US2019/049956 dated Nov. 2, 2019.

* cited by examiner

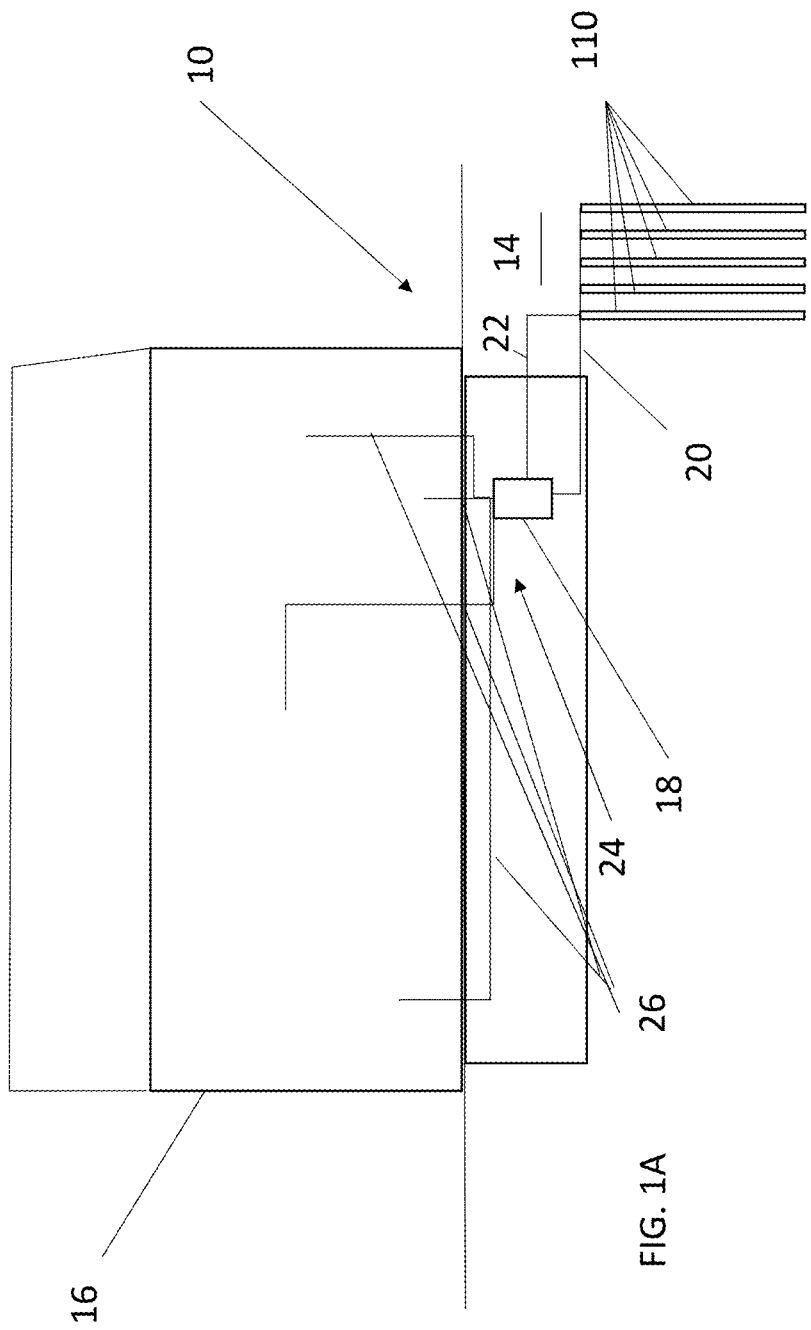

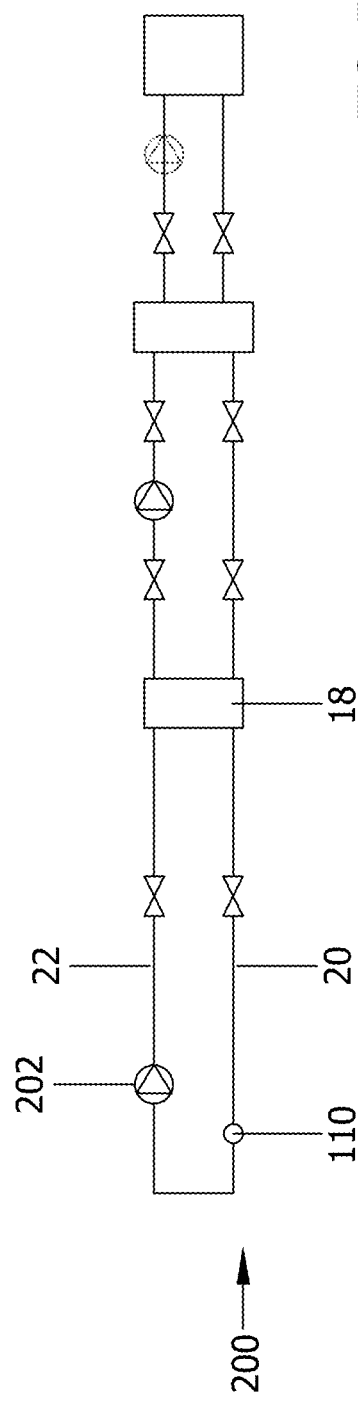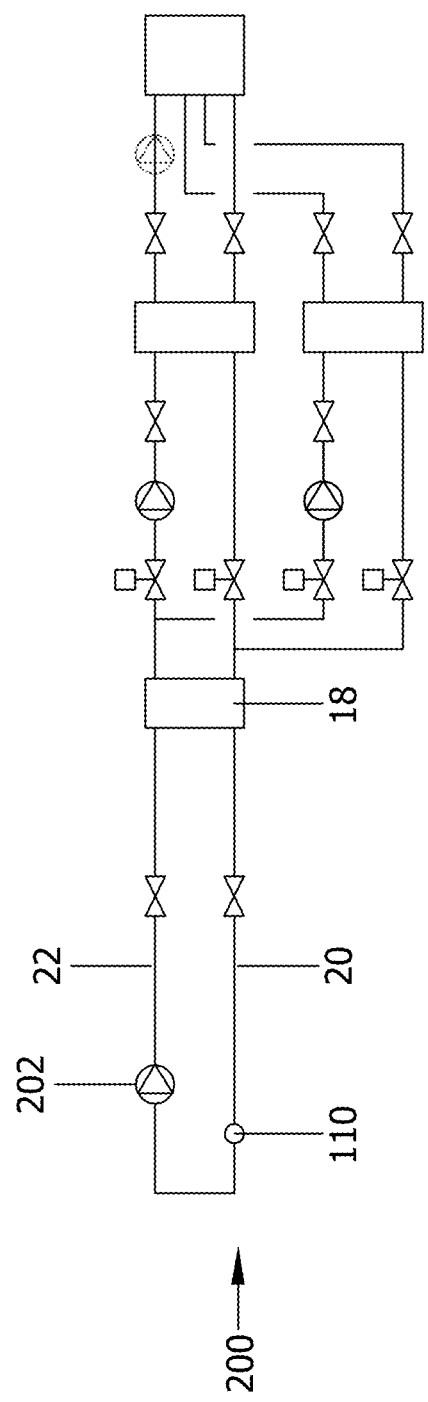

VERTICAL HEAT EXCHANGER FOR A GEOTHERMAL HEATING AND COOLING SYSTEM AND METHOD OF USE

CROSS REFERENCE TO RELATED APPLICATIONS

This application claims priority to U.S. Provisional Patent Application Ser. No. 62/728,532 filed on Sep. 7, 2018, the contents of which are incorporated herein by reference thereto.

BACKGROUND

Exemplary embodiments of the present disclosure pertain to the art of geothermal heating and cooling systems and components thereof.

In a geothermal heating and cooling system heat exchangers are inserted into the ground. The heat exchangers are configured to transfer fluid into and out of the ground in order to operate the system.

Accordingly, it is desirable to provide heat exchangers that optimize the surface area of the heat exchanger in order improve the efficiency of the heat exchanger.

BRIEF DESCRIPTION

A ground source heat exchanger is described herein, The ground source heat exchanger including: a first fluid conduit, the first fluid conduit having a first arcuate configuration with a first plurality of separate passages extending therethrough; a second fluid conduit, the second fluid conduit having a second arcuate configuration with a second plurality of separate passages extending therethrough; and an end cap secured to a distal end of the first fluid conduit and a distal end of the second fluid conduit, wherein the end cap fluidly couples the first plurality of separate passages of the first fluid conduit to the second plurality of separate passages of the second fluid conduit, wherein the first fluid conduit and the second fluid conduit when secured to the end cap define an internal cavity extending through the ground source heat exchanger.

In addition to one or more of the features described above, or as an alternative to any of the foregoing embodiments, the ground source heat exchanger further includes: a first transition located at a proximal end of the first fluid conduit, the first transition fluidly coupling the first plurality of separate passages to an opening of the first transition.

In addition to one or more of the features described above, or as an alternative to any of the foregoing embodiments, the ground source heat exchanger further includes: a second transition located at a proximal end of the second fluid conduit, the second transition fluidly coupling the second plurality of separate passages to an opening of the second transition.

In addition to one or more of the features described above, or as an alternative to any of the foregoing embodiments, the second plurality of separate passages are greater than the first plurality of separate passages.

In addition to one or more of the features described above, or as an alternative to any of the foregoing embodiments, the end cap has an outer periphery and the first fluid conduit has an outer periphery and the second fluid conduit has an outer periphery, wherein the outer periphery of the first fluid conduit and the outer periphery of the second fluid conduit define an outer periphery of the ground source heat exchanger when the first fluid conduit and the second fluid conduit are secured to the end cap, and wherein the outer periphery of the ground source heat exchanger is not greater than the outer periphery of the end cap.

In addition to one or more of the features described above, or as an alternative to any of the foregoing embodiments, wherein the first fluid conduit has an outer periphery and the second fluid conduit has an outer periphery, wherein the outer periphery of the first fluid conduit and the outer periphery of the second fluid conduit define an outer periphery of the ground source heat exchanger when the first fluid conduit and the second fluid conduit are secured to the end cap, and wherein the outer periphery of the second fluid conduit is greater than the outer periphery of the first fluid conduit.

In addition to one or more of the features described above, or as an alternative to any of the foregoing embodiments, wherein the end cap has an opening extending therethrough the opening being in fluid communication with the internal cavity when the first fluid conduit and the second fluid conduit are secured to the end cap.

In addition to one or more of the features described above, or as an alternative to any of the foregoing embodiments, wherein at least the first fluid conduit and the second fluid conduit are formed from high-density polyethylene.

In addition to one or more of the features described above, or as an alternative to any of the foregoing embodiments, wherein the first fluid conduit has an inner periphery and the second fluid conduit has an inner periphery each being spaced from each other when the first fluid conduit and the second fluid conduit are secured to the end cap.

In addition to one or more of the features described above, or as an alternative to any of the foregoing embodiments, wherein the first fluid conduit has a kidney shape and the second fluid conduit has a semi-circular shape.

Also disclosed is a geothermal system. The geothermal system including: a plurality of vertical heat exchangers in fluid communication with a heat pump via at least one supply conduit and at least one return conduit, wherein each of the plurality of vertical heat exchangers include: a first fluid conduit, the first fluid conduit having a first arcuate configuration with a first plurality of separate passages extending therethrough; a second fluid conduit, the second fluid conduit having a second arcuate configuration with a second plurality of separate passages extending therethrough; and an end cap secured to a distal end of the first fluid conduit and a distal end of the second fluid conduit, wherein the end cap fluidly couples the first plurality of separate passages of the first fluid conduit to the second plurality of separate passages of the second fluid conduit, wherein the first fluid conduit and the second fluid conduit when secured to the end cap define an internal cavity extending through the ground source heat exchanger.

In addition to one or more of the features described above, or as an alternative to any of the foregoing embodiments, each of the plurality of vertical heat exchanges include: a first transition located at a proximal end of the first fluid conduit, the first transition fluidly coupling the first plurality of separate passages to an opening of the first transition.

In addition to one or more of the features described above, or as an alternative to any of the foregoing embodiments, each of the plurality of vertical heat exchanges include: a second transition located at a proximal end of the second fluid conduit, the second transition fluidly coupling the second plurality of separate passages to an opening of the second transition.

In addition to one or more of the features described above, or as an alternative to any of the foregoing embodiments, the second plurality of separate passages are greater than the first plurality of separate passages.

In addition to one or more of the features described above, or as an alternative to any of the foregoing embodiments, the end cap has an outer periphery and the first fluid conduit has an outer periphery and the second fluid conduit has an outer periphery, wherein the outer periphery of the first fluid conduit and the outer periphery of the second fluid conduit define an outer periphery of the ground source heat exchanger when the first fluid conduit and the second fluid conduit are secured to the end cap, and wherein the outer periphery of the ground source heat exchanger is not greater than the outer periphery of the end cap.

In addition to one or more of the features described above, or as an alternative to any of the foregoing embodiments, the first fluid conduit has an outer periphery and the second fluid conduit has an outer periphery, wherein the outer periphery of the first fluid conduit and the outer periphery of the second fluid conduit define an outer periphery of the ground source heat exchanger when the first fluid conduit and the second fluid conduit are secured to the end cap, and wherein the outer periphery of the second fluid conduit is greater than the outer periphery of the first fluid conduit.

In addition to one or more of the features described above, or as an alternative to any of the foregoing embodiments, the end cap has an opening extending therethrough the opening being in fluid communication with the internal cavity when the first fluid conduit and the second fluid conduit are secured to the end cap.

In addition to one or more of the features described above, or as an alternative to any of the foregoing embodiments, at least the first fluid conduit and the second fluid conduit are formed from high-density polyethylene.

In addition to one or more of the features described above, or as an alternative to any of the foregoing embodiments, the first fluid conduit has an inner periphery and the second fluid conduit has an inner periphery each being spaced from each other when the first fluid conduit and the second fluid conduit are secured to the end cap.

In addition to one or more of the features described above, or as an alternative to any of the foregoing embodiments, the first fluid conduit has a kidney shape and the second fluid conduit has a semi-circular shape.

Also disclosed herein is a method of installing a ground source heat exchanger of a geothermal system below ground level. The method including the steps of: securing a first fluid conduit to a second fluid conduit via an end cap to create the ground source heat exchanger, wherein the first fluid conduit has a first arcuate configuration with a first plurality of separate passages extending therethrough and the second fluid conduit has a second arcuate configuration with a second plurality of separate passages extending therethrough, and wherein the end cap is secured to a distal end of the first fluid conduit and a distal end of the second fluid conduit, wherein the end cap fluidly couples the first plurality of separate passages of the first fluid conduit to the second plurality of separate passages of the second fluid conduit, wherein the first fluid conduit and the second fluid conduit when secured to the end cap define an internal cavity extending through the ground source heat exchanger; inserting the ground source heat exchanger into a borehole; and filling the internal cavity with grout after the ground source heat exchanger has been inserted into the borehole.

BRIEF DESCRIPTION OF THE DRAWINGS

The following descriptions should not be considered limiting in any way. With reference to the accompanying drawings, like elements are numbered alike:

FIGS. 1 and 1A are schematic illustrations of a geothermal system;

FIGS. 4-8 are schematic illustrations of systems contemplated for use with the vertical heat exchanger of various embodiments of the present disclosure.

DETAILED DESCRIPTION

Figure 1:
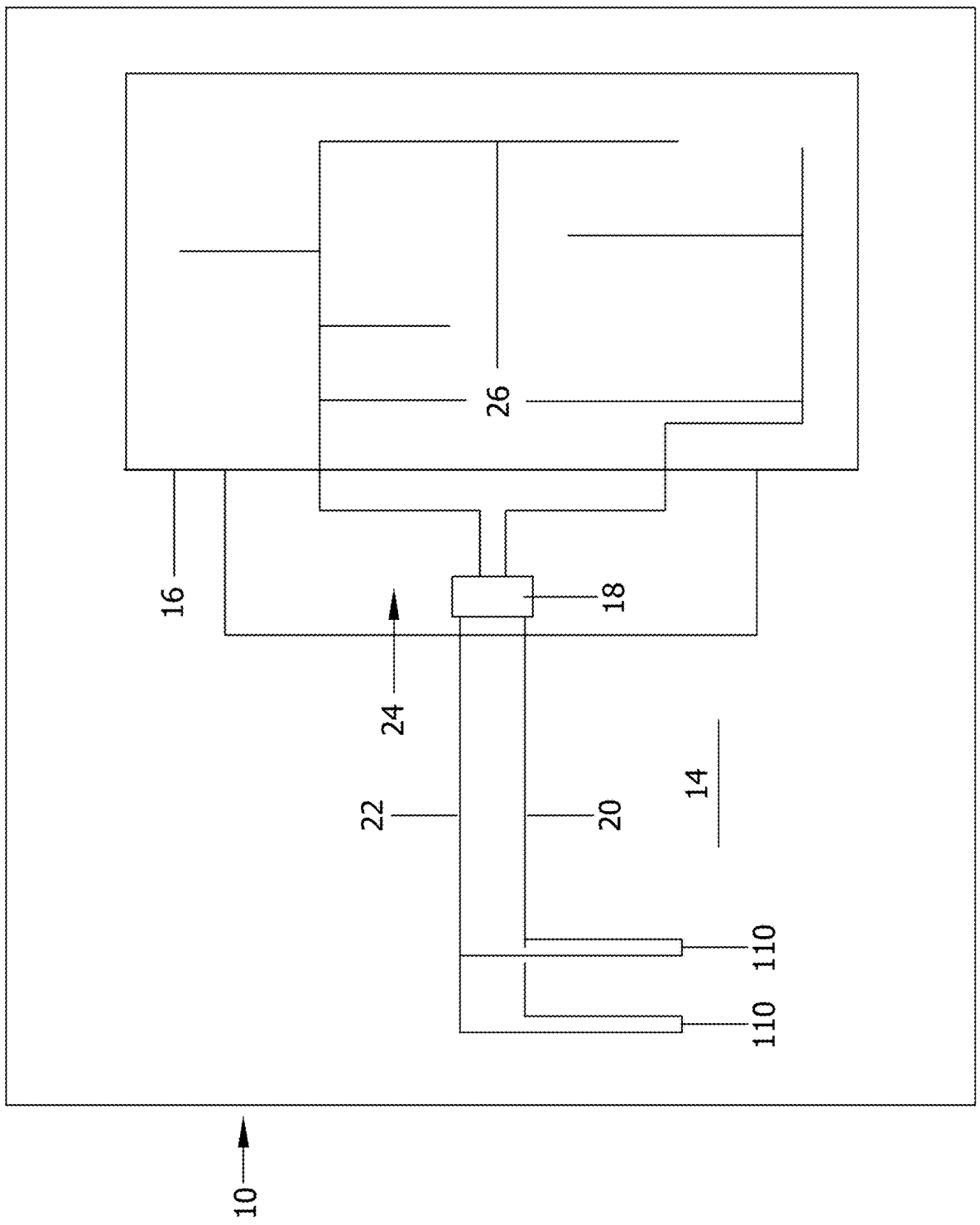

A detailed description of one or more embodiments of the disclosed apparatus and method are presented herein by way of exemplification and not limitation with reference to the Figures. FIGS. 1 and 1A are schematic illustrations of a geothermal system 10 in accordance with one non-limiting embodiment of the present disclosure. Here a plurality of vertical heat exchangers or heat exchanger assemblies 110 are located in the earth 14 surrounding a structure 16, which in one embodiment may be a residential home. The plurality of vertical heat exchangers 110 are in fluid communication with a heat pump 18 via at least one supply conduit 20 and at least one return conduit 22.

The heat pump is operably coupled to a heating and ventilating system 24 comprising a plurality of conduits (supply and/or return) 26 located throughout the structure 16.

Figure 2A:
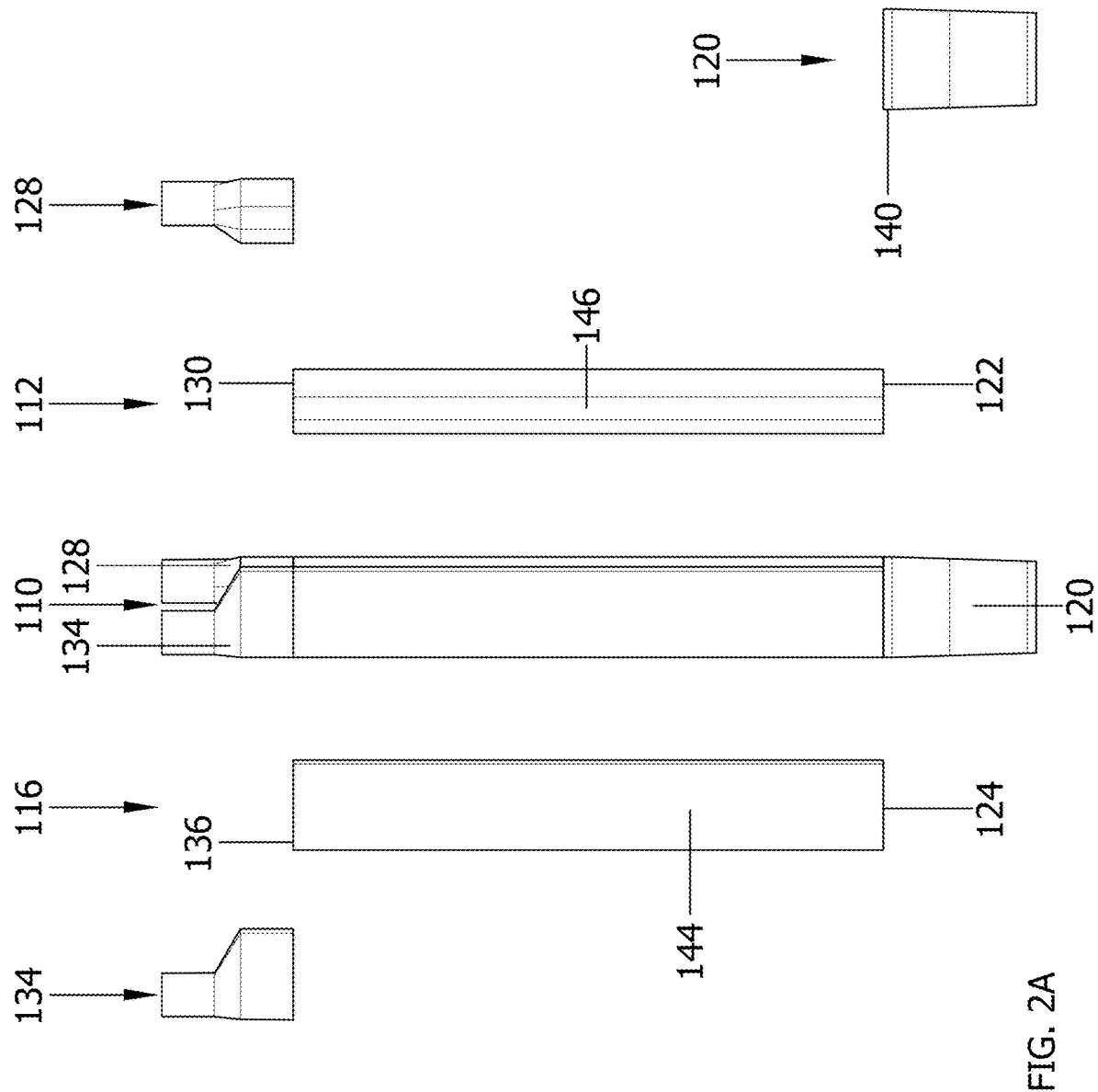
FIGS. 2A-2C are assembled, exploded and sectional views of a vertical heat exchanger in accordance with an embodiment of the present disclosure.
Figure 2B:
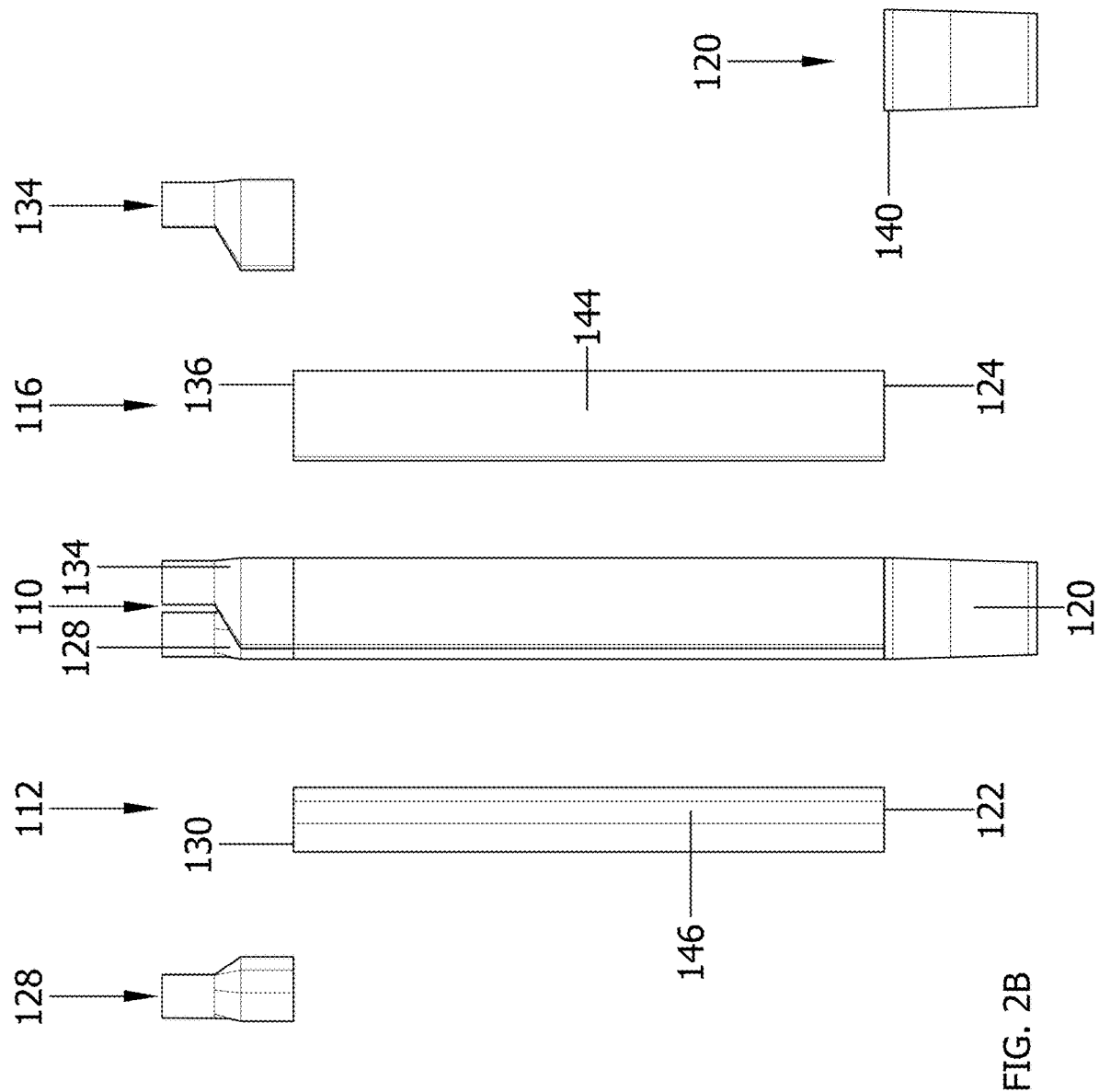
Figure 2C:
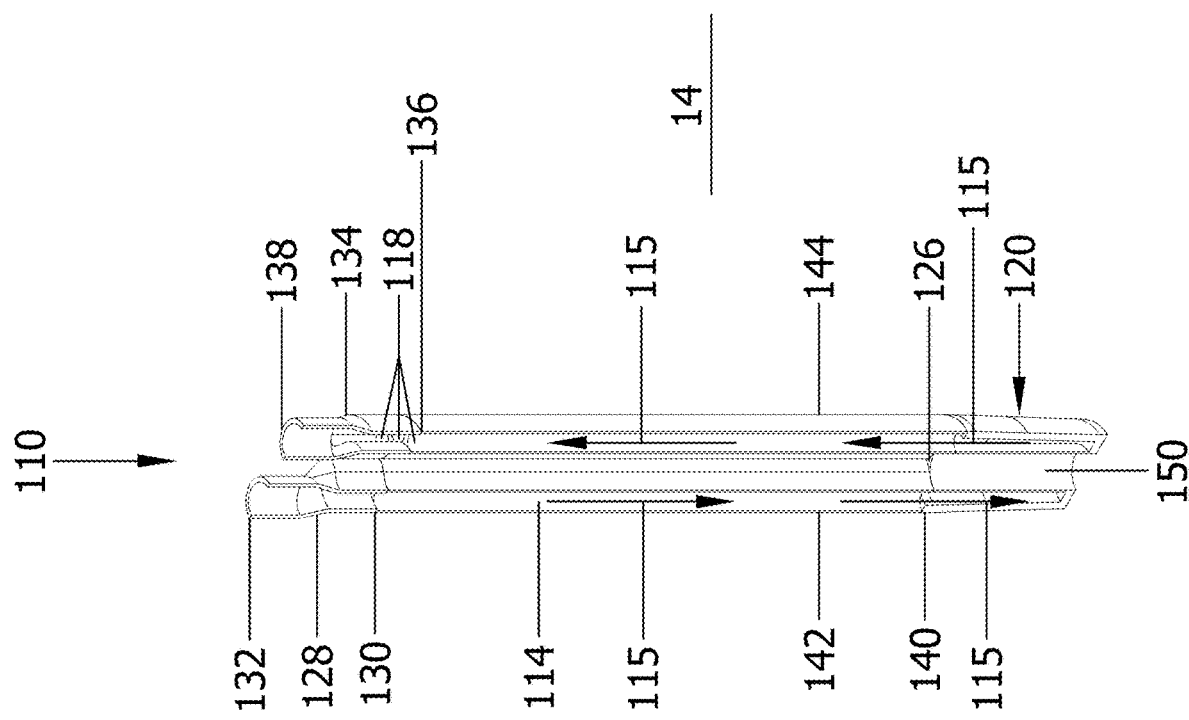
Figure 3:
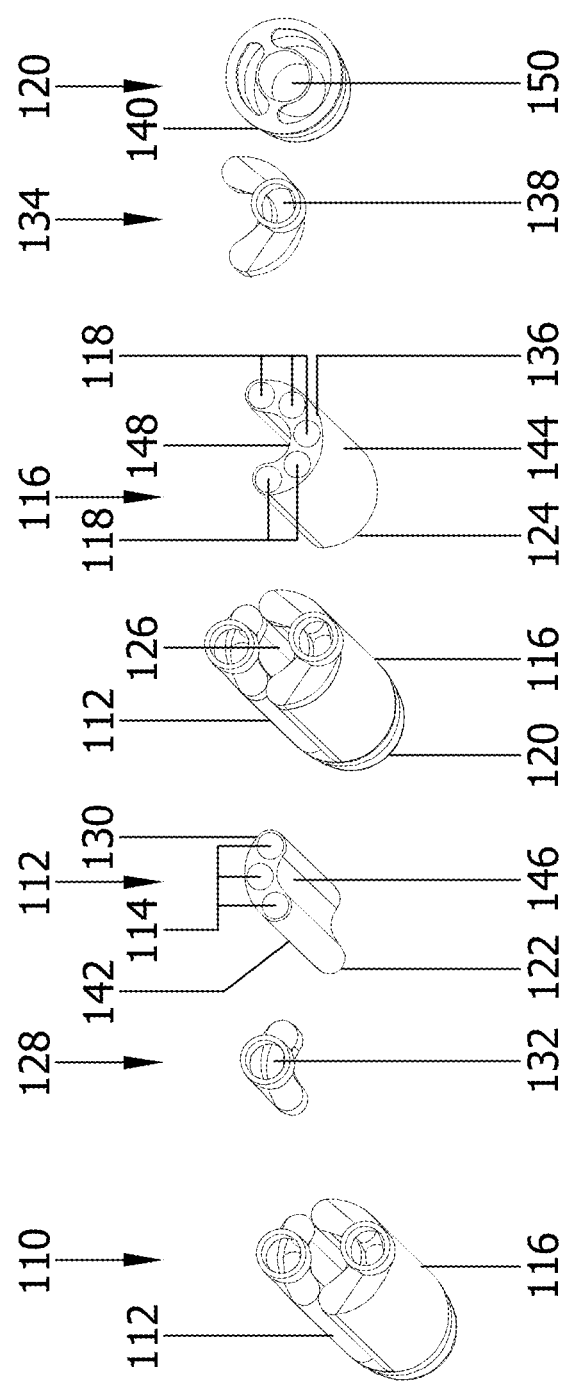
FIG. 3 is an exploded view of a vertical heat exchanger in accordance with an embodiment of the present disclosure.

FIGS. 2A-2C are assembled, exploded and sectional views of a vertical heat exchanger 110 in accordance with an embodiment of the present disclosure. Referring now to FIGS. 2A-3, a ground source heat exchanger or heat exchanger assembly 110 is illustrated. The ground source heat exchanger 110 has a first fluid conduit or supply conduit 112. The first fluid conduit or supply conduit 112 has a first arcuate configuration with a first plurality of separate passages 114 extending therethrough. The ground source heat exchanger 110 also includes a second fluid conduit or return conduit 116. The second fluid conduit or return conduit 116 has a second arcuate configuration with a second plurality of separate passages 118 extending therethrough. Each ground source heat exchanger 110 further includes an end cap 120 secured to a distal end 122 of the first fluid conduit 112 and a distal end 124 of the second fluid conduit 116. The end cap 120 fluidly couples the first plurality of separate passages 114 of the first fluid conduit 112 to the second plurality of separate passages 118 of the second fluid conduit 116. This fluid flow is illustrated by arrows 115 in FIG. 2C. The first fluid conduit 112 and the second fluid conduit 116 when secured to the end cap 120 define an internal cavity 126 extending through the ground source heat exchanger 110.

The heat exchanger 110 also includes a first transition 128 located at a proximal end 130 of the first fluid conduit 112, the first transition 128 fluidly couples the first plurality of separate passages 114 to an opening 132 of the first transition 128. The heat exchanger 110 also includes a second transition 134 located at a proximal end 136 of the second fluid conduit 116, the second transition 134 fluidly couples the second plurality of separate passages 118 to an opening 138 of the second transition 134.

In one embodiment, the number of the second plurality of separate passages 118 are greater than the number of the first plurality of separate passages 114. As illustrated in the FIGS., the end cap 120 has an outer periphery 140 and the first fluid conduit 112 has an outer periphery 142 and the second fluid conduit 116 has an outer periphery 144. In one embodiment, the outer periphery 142 of the first fluid conduit 112 and the outer periphery 144 of the second fluid conduit 116 define an outer periphery of the ground source heat exchanger 110 when the first fluid conduit 112 and the second fluid conduit 116 are secured to the end cap 120. In one embodiment, the outer periphery of the ground source heat exchanger 110 is not greater than the outer periphery 140 of the end cap 120.

In one non-limiting embodiment, the outer periphery 144 of the second fluid conduit 116 is greater than the outer periphery 142 of the first fluid conduit 112. As illustrated and in one embodiment, the end cap 120 has an opening 150 extending therethrough the opening 150 being in fluid communication with the internal cavity 126 when the first fluid conduit 112 and the second fluid conduit 116 are secured to the end cap 120.

In one non-limiting embodiment, the first fluid conduit 112 and the second fluid conduit 116 are formed from high-density polyethylene. Of course, other materials are considered to be within the scope of various embodiments of the present disclosure.

Also shown is that the first fluid conduit 112 has an inner periphery 146 and the second fluid conduit 116 has an inner periphery 148 each being spaced from each other when the first fluid conduit 112 and the second fluid conduit 116 are secured to the end cap 120. Also shown and in one non-limiting embodiment, is that the first fluid conduit 112 has a kidney shape and the second fluid conduit 116 has a semi-circular shape. Of course, other configurations are considered to be within the scope of various embodiment of the present disclosure.

The heat exchanger 110 may be used to construct GeoExchange fields that are coupled with ground source heat pumps used in HVAC and hot water generating systems for residential, commercial and industrial applications. In configurations that require more robust materials, it can be used to extract heat from the Earth's crust at temperatures and pressures as required to generate electricity.

The heat exchanger 110 is engineered to maximize the contact surface area of the heat exchanger 110 with the borehole wall into which the heat exchanger 110 is installed.

collapse due to formation and grout pressures at depths greater than are achievable using conventional heat exchangers.

In one embodiment and when installing a GeoExchange field using the heat exchangers 110 disclosed herein, total drilling can be reduced by over ⅔ compared to using a conventional vertical heat exchanger.

In the below example a commercial computer assisted GeoExchange field design software package was used to compare use of heat exchangers 110 versus U-bend (1¼") heat exchanger. The below example shows the total reduction in quantity of vertical heat exchangers required by using heat exchangers 110 instead of U-bend (1¼") heat exchangers. Therefore, the reduction in the field footprint is directly related to the properties of the formation and the balance of the heat gain and loss of the structure. In the below example, the required drilling can be reduced by as much as 70% depending on the building loads, use, and hours of operation.

The below example uses the following variable inputs into a commercial computer assisted GeoExchange field design software package modified to compensate for the short term effect difference between U-bend heat exchangers and using heat exchangers 110.

Example based on actual load calculations and formation properties.

Identical inputs for the formation and load conditions for a recent residential development:

| | |
|---|---|
| Cooling Block Peak Load | 2602.2 kBTUh EFLH 1045 |
| Heating Block Peak Load | 3143.4 kBTUh EFLH 1745 |
| Formation Undisturbed Temperature | 53° F. |
| Formation Thermal Conductivity | 1.40 BTU/(h*ft*° F.) |
| Formation Thermal Diffusivity | 0.91 Ft$^2$/day |
| Grout Thermal Conductivity | 1.40 BTU(h*ft*° F.) |
| Field Effect | 20 years |
| GSHP Equipment | ClimateMaster TC024 |
| Fluid | 18.3% Propylene Glycol |
| Placement of Heat Exchanger | Average |
| Borehole Diameter | 6" |

This design was completed with 95° F. considered to the maximum design cutoff temperature and 30° F. to be the minimum design cutoff temperature. Comparative Results using U-bend and heat exchanger 110:

| Heat Exchanger | # of Bores | Depth of Bores | Total LF of Bores | Max Temp of Field °F. | Min Temp of Field °F. | Annual Total kBTU Cooling | Annual Total kBTU Heating |
|---|---|---|---|---|---|---|---|
| U-bend (1-1/4") | 147 | 400 | 58,800 | 65.7 | 39.6 | 2,736,505 | 3,839,419 |
| Heat Exchanger 110 | 56 | 400 | 22,400 | 65.6 | 39.8 | 2,736,505 | 3,839,419 |

The configuration of the heat exchanger 110 maximizes the separation distance and the insulation between the supply and return conduits, which can be either the first fluid conduit 112 or the second fluid conduit 116. The disclosed configuration is engineered to more efficiently utilize the lower portion of the borehole than typical heat exchangers. As used herein the lower portion of the borehole refers to areas in which the end cap 120 and portions of the first fluid conduit or supply conduit 112 and the second fluid conduit or return conduit 116 proximate to the end cap 120 are located in the borehole. The heat exchanger 110 is designed to minimize parasitic losses due to the interaction between the supply and return conduits. It is designed to resist Convection heat transfer is fundamentally a time-at-temperature process, hence return conduit Reynolds number (Re) dependent, with actual magnitude exchange surface area dependence. The heat exchanger 110 design maximizes available exchange surface area in comparison, and the reduced return conduit Re increases time-at-temperature, both fundamental first principles of impact on thermal exchange improvement compared to other geothermal heat exchangers.

One key measurable factor of heat exchanger 110 performance, in comparison to a U-bend with comparable flow performance, occurs in the first tens of hours of installation startup. Readily apparent is the factor of 4 increase in time required for the heat exchanger 110 LWT to reach the design cutoff compared with the U-bend. This distinction is directly Re optimization+ extreme exchange surface area intrinsic to heat exchanger 110.

One additional fundamental factor that determines the comparison results between heat exchanger 110 and other heat exchangers is the formation thermal conductivity and diffusivity. Both a greater thermal conductivity and lesser thermal diffusivity produce larger differences in the comparisons. The effects are cumulative.

Using the comparative analysis above, the total length of a one row GeoExchange U-bend field with bores spaced at 25' would be 3,650 feet compared to 1,100 feet for heat exchanger 110, a 70% reduction in linear space. Comparing a field constructed with 147 U-bend bores in a 21×7 configuration, 75,000 sq. ft. with a heat exchanger 110 field of 56 bores in an 8×7 configuration or 26,250 sq. ft. results in a 65% reduction in area.

As such, the heat exchanger 110 can reduce the footprint of a field by over ⅔ when compared to the area required for a field constructed with conventional vertical heat exchangers. The systems disclosed herein are closed loop systems that offer maximum efficiency compared to existing technologies with no significant adverse impact on the environment.

As illustrated, the heat exchanger 110 has separate transitions caps 128, 134 for the supply and return conduit casings. In one embodiment, the transitions caps 128, 134 are fused with the first and second fluid conduits 112, 116 while the end cap 120 is designed to also fuse with the specific conduit casing (e.g., first and second fluid conduits 112, 116). In one embodiment, the transitions caps 128, 134 are configured to minimize pressure drop due to turbulence.

The configuration of the heat exchanger 110 also simplifies grout tube insertion during installation of the heat exchanger 110 into the soil, which reduces labor costs. By providing separate conduit casings 112, 116 to house the supply and return conduits 114, 118 a pathway 126 for the grout tube is provided without extruding a specific conduit for grout. In other words, opening 126 serves as the pathway for the grout tube.

In accordance with various embodiment of the present disclosure, the heat exchanger 110 disclosed herein reduces the material required for construction of heat exchangers 110 and expands the area available for encased fluid conduits. The configuration of the first and second fluid conduits 112, 116 allows the conduits to be coiled for storage and installation.

In addition and by providing the internal cavity 126 the heat exchanger 110 allows grout to fill the annular space outside of the supply and return conduits 112, 116 and the space or cavity 126 in between the supply and return conduits 112, 116. Also, the configuration of the heat exchanger 110 allows both conduit sets to make contact with the formation of the wall the heat exchanger 110 is inserted into.

In one embodiment, the end cap 120 is configured to fuse the two conduit casings 112, 116 into a single system and the end cap 120 defines the diameter of the borehole reducing the annular space between the borehole walls and an exterior surface of the supply and return conduits 112, 116 to a minimum. Also and by incorporating an opening 150 through the end cap 120 a path is provided for the grout pipe to reach the bottom of the hole. The end cap 120 is also designed to increase turbulence in the bottom of the system thereby increasing the heat exchange with the formation below the system.

The heat exchanger 110 disclosed herein is a new form of engineered ground source heat exchanger, also referred to as a GeoExchange heat exchanger. In this configuration, it can be used to construct GeoExchange fields that are coupled with ground source heat pumps used in HVAC and hot water generating systems for residential, commercial and industrial applications. In addition and in configurations that require more robust materials, it can be used to extract heat from the Earth's crust at temperatures and pressures as required to generate electricity.

The heat exchanger 110 is configured to maximize the surface contact area of the heat exchanger with the formation at the borehole wall. It is also configured to maximize the separation distance and the insulation between the supply and return conduits (e.g., cavity 126). It is configured to more efficiently utilize the lower portion of the borehole than typical heat exchangers. In addition it also minimizes parasitic losses due to the interaction between the supply and return conduits. The heat exchanger 110 also resists collapse due to formation and grout pressures at depths greater than are achievable using conventional heat exchangers.

When installing the heat exchanger 110 or a plurality of heat exchanger 110 into a system, the total drilling can be reduced by over ⅔ compared to when using a conventional vertical heat exchanger. This is illustrated in the above example. The heat exchanger 110 can also reduce the footprint of a field by when compared to the area required for a field constructed with conventional vertical heat exchangers. The heat exchanger 110 disclosed herein is a closed loop system that offers maximum efficiency compared to existing technologies with no significant adverse impact on the environment.

As disclosed herein the heat exchanger 110 is a vertical heat exchanger primarily for use with earth linked, more commonly referred to as geothermal or GeoExchange, HVAC systems. In one embodiment, the heat exchanger 110 is designed to be viable to depths up to 1500 feet and provide heat exchange for building loads up to 150,000 BTUh per borehole.

As discussed above the heat exchanger 110 is composed of two conduits, supply and return, formed so that when they are brought together their outer walls form what closely resembles the outer wall of a single pipe with the outer dimensions of a conventional pipe with a third conduit formed down the center.

The two conduits of the heat exchanger 110 are constructed as reinforced continuous conduits designed to carry fluids for the full length of the heat exchanger under pressure. The reinforcement simultaneously resists the external pressure exerted by the formation and grout preventing collapse of the conduits.

The third conduit formed down the center by bringing the two conduits together is dimensioned to allow the acceptance of a tremie (grouting) tube of sufficient size to allow pumping of enhanced grout through the tube to the bottom of the borehole with the heat exchanger in place.

The two conduits are joined at one end by an end cap that provides a closed loop path for the fluid from the supply (down) conduit to the return (up) conduit of the heat exchanger. As the grout is pumped down the tremie tube and the tremie tube is retracted from the borehole, the two conduits will spread apart providing maximum contact of their outer surfaces with the borehole wall and maximum separation from each other. As such and in some embodiments, the conduits will bow outward between the end cap and the transitions to further maximize contact of their outer surfaces with the borehole wall and maximum separation from each other.

The two conduits are connected to the distribution system with butt fuse fittings specifically designed as transitions from the shape of the individual conduits to standard HDPE pipe sizes, for example and in one non-limiting embodiment from the first conduit or supply conduit 112 to a supply conduit for example a 1½" SDR11 HDPE.

The asymmetrical design of the two conduits provides maximum heat exchange between the heat exchanger and the formation as well as the utilization of the lower portions of the borehole.

The round fluid ports between the reinforcing bands in the conduits provide maximum efficiency for pressure drop at any given flow rate while maintaining sufficient flow turbulence for greatest heat exchange.

In one embodiment the heat exchanger 110 may be extruded with bimodal HDPE material such as HDPE 100 or similar ultrahigh density polyethylene resins. After extrusion, it may be rolled, banded or shrink wrapped for storage and/or shipping or stored and shipped on reels. If it is manufactured to specific lengths to match the borehole depth where it is intended to be installed, or if required by code, end caps may be factory installed by heat fusion. The transition fittings may be field installed by heat fusion.

In one embodiment, the heat exchanger 110 may be installed as follows, after a borehole is drilled and prepared, an appropriate length of the heat exchanger 110 may be pulled off the roll and straightened. A weighted anchor if desired is attached to the end cap 120 and a tremie tube is placed through the center hole of the end cap and the heat exchanger assembly 110 is pushed down the borehole, usually with mechanical assistance. The heat exchanger assembly 110 continues to be pulled off the roll and straightened while the tremie tube is threaded into the center of the assembly and pushed down the borehole until the bottom of the borehole is reached. The installer may fill the conduits with water to help offset the buoyancy created by the empty space in the conduits.

The borehole is then grouted per IGSHPA standards while the tremie tube is extracted and the heat exchanger is subsequently pressure tested. After pressure testing, the ends of the heat exchanger are sealed to prevent foreign material from entering the heat exchanger or it may be connected to the distribution system.

No mechanical connectors are used. All joints are heat fused per IGSHPA standards. No field joints are allowed in the borehole.

Although the heat exchanger 110 may be used in any earth coupled or lake loop heat exchange application with fluid operating temperatures between 25° F. and 125° F., one application is as a vertical heat exchanger for use with extended range ground source heat pump equipment. It is especially practical for areas where limited space prevents the use of conventional U-bend systems or where environmental concerns or maintenance issues prohibit the use of standing column well systems. It is an outstanding alternative in areas where drilling cost or installation labor cost render U-bend systems cost prohibitive because it requires only 30-35% of the total linear feet of active heat exchanger when compared to U-bend systems with comparable flow characteristics, can be installed in a borehole of comparable diameter, and can be installed, per foot, in a comparable time frame.

FIGS. 4-8 are schematic illustrations of systems contemplated for use with the vertical heat exchanger of various embodiments of the present disclosure.

Figure 4:
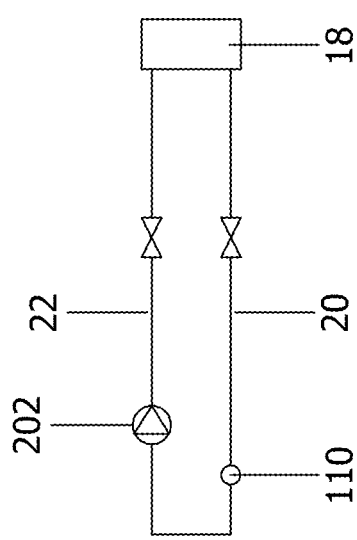
Figure 5:
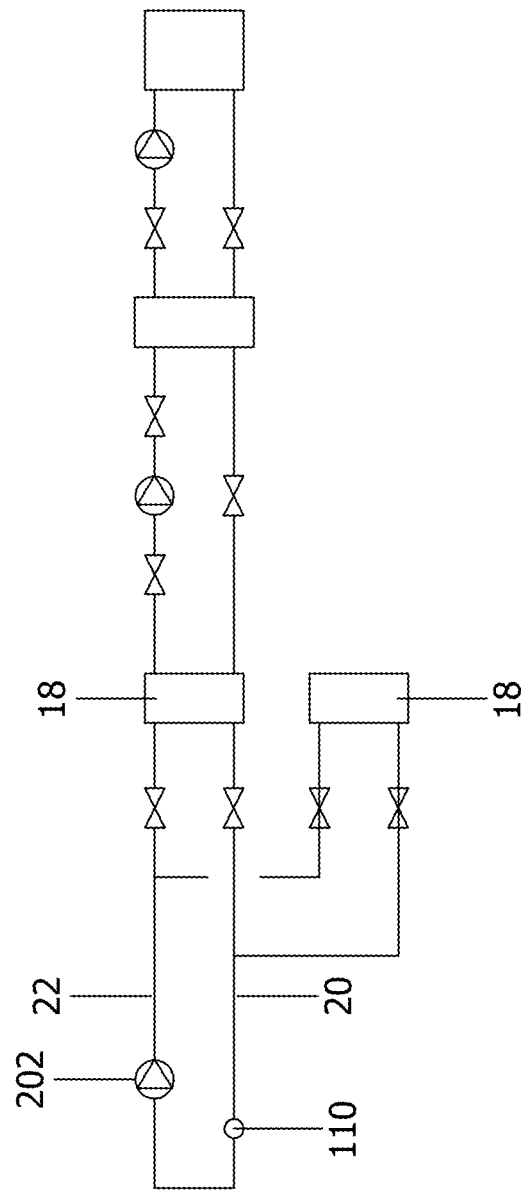

For example, FIGS. 4 and 5 illustrate a GeoExchange system in a residential application. FIG. 4 illustrates a forced air heating only system 200. The forced air heating only system may be designed as a water-to-water forced air system using fan coil units (FCU) to supply heat to the conditioned space, or air handling units (AHU) to supply heat to the conditioned space.

FIG. 4 illustrates the basic relationship between the GeoExchange System constructed with heat exchanger 110 or a plurality of heat exchanger 110 and any type of building system or process. Heat exchanger 110 is a closed loop system that exchanges heat between a geological feature and any other system or process adding or removing heat. A pump moves fluid from the GeoExchange System through a heat exchanger utilized by the Building or Process System 200 and returns the fluid to the GeoExchange system for recirculation.

FIG. 4 illustrates a basic building system 200 that can be operably coupled to a plurality or at least one heat exchanger 110. At least one pump 202 moves fluid from the heat exchanger 110 through a GSHP 18 utilized by the building system 200. The building system 200 exchanges heat with the fluid and the fluid returns to the heat exchanger 110. The fluid exchanges heat with the formation and is recirculated through the building system 200 by the pumping unit 202 in a closed loop. As used herein and below, "formation" refers to the earth the heat exchanger 110 is buried in.

FIG. 5 illustrates how heat exchanger 110 may be used with building systems that operate in heating and cooling modes simultaneously. For example, FIG. 5 illustrates a building system 200 that is equipped with multiple GSHP urns in a single system that can be operably coupled to a plurality or at least one heat exchanger 110. At least one pump 202 moves fluid from the heat exchanger 110 system through equipment 18 utilized by the building system 200. The building system 200 exchanges heat with the fluid and the fluid returns to the heat exchanger 110. The fluid exchanges heat with the formation and is recirculated through the building system 200 by the pumping unit 202. This system is a closed loop system.

Figure 6:
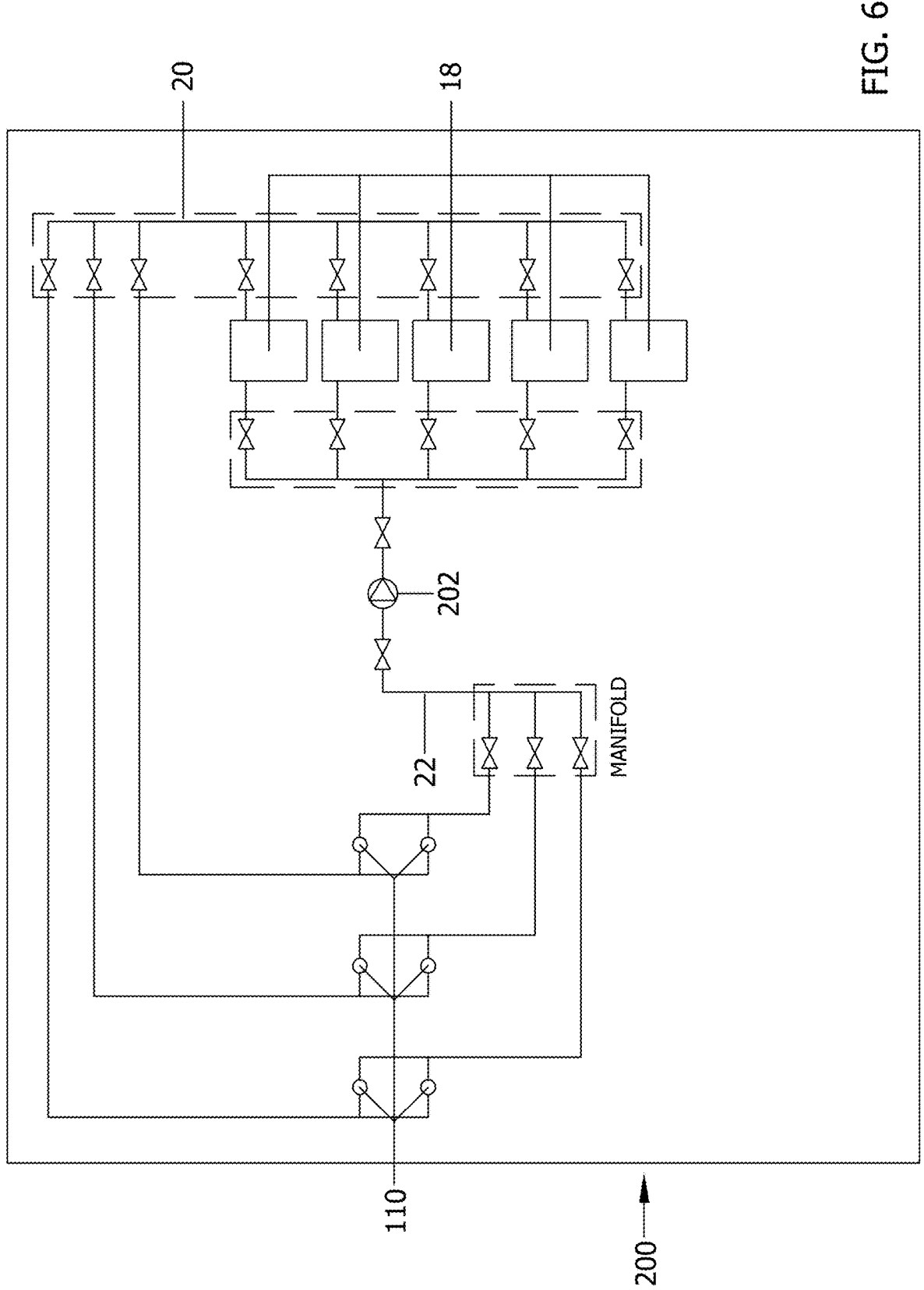

FIG. 6 illustrates how a multi-zone heat exchanger 110 system can be connected to a multi-zone building system running multiple processes simultaneously. FIG. 6 illustrates a building system 200 with multiple zones and multiple and diverse applications of GSHP 18 that can be operably coupled to a plurality or at least one heat exchanger 110. At least one pump 202 moves fluid from the heat exchanger 110 exchanger through the building system 200. The building system 200 exchanges heat with the fluid and the fluid returns to the heat exchanger 110. The fluid exchanges heat with the formation and is recirculated through the building system 200 by the pumping unit 202. This system is a closed loop system.

FIGS. 7A and 7B illustrate how a heat exchanger 110 system may be utilized by a single purpose or dual purpose building system 200, for instance heating only, cooling only, or heating and cooling.

In FIGS. 7A and 7B a building system 200 is operated as a chilled water and heating hot water system that can be operably coupled to a plurality or at least one heat exchanger 110. At least one pump 202 moves fluid from the heat exchanger 110 through a GSHP 18 utilized by the building system 200. The building system 200 exchanges heat with the fluid and the fluid returns to the heat exchanger 110. The fluid exchanges heat with the formation and is recirculated through the building system 200 by the pumping unit 202. This system is a closed loop system.

Figure 8:
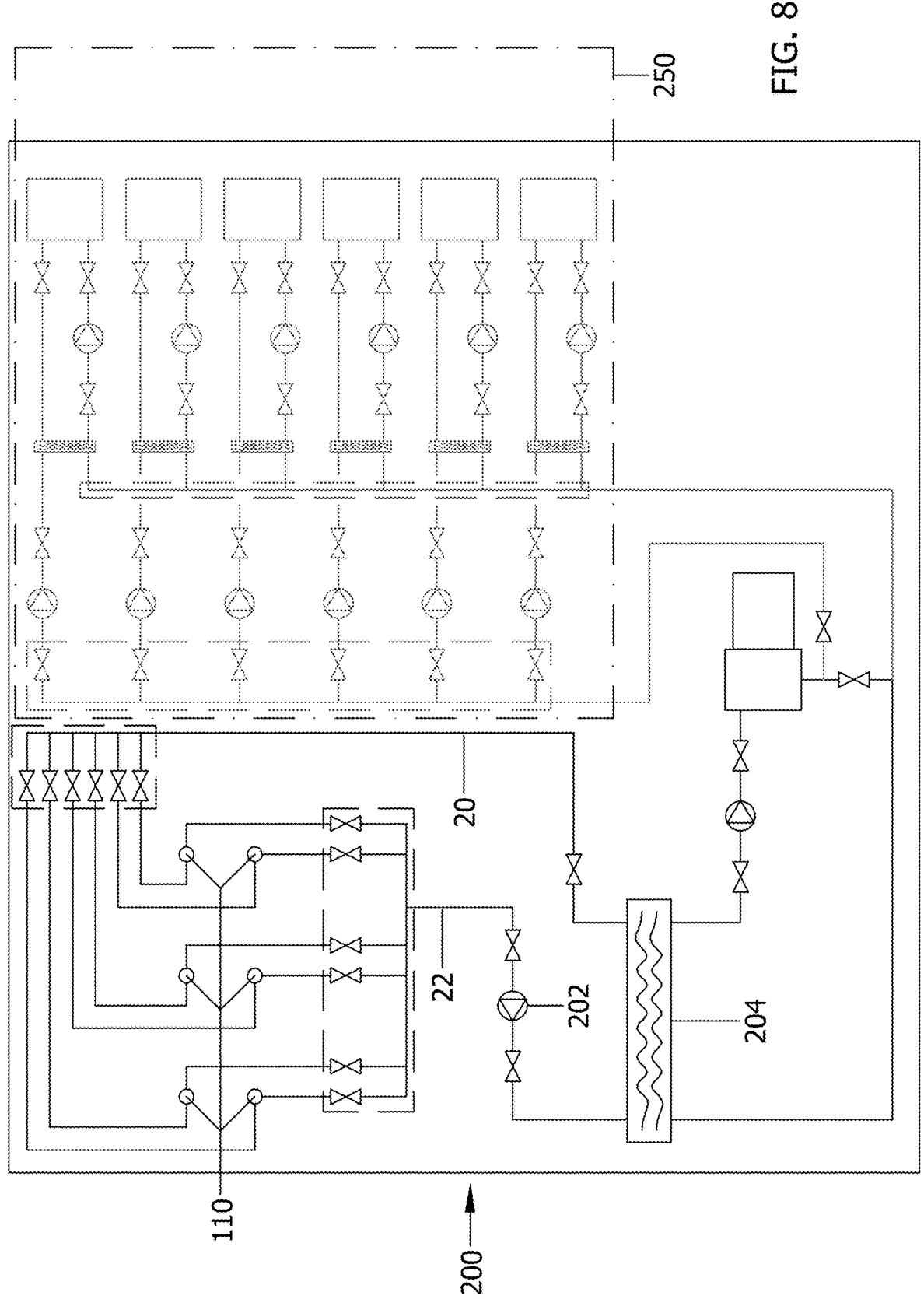

FIG. 8 illustrates how a heat exchanger 110 system can be isolated from a single purpose or multi-purpose building systems 200 to protect the purity of the fluid circulating in the heat exchanger 110.

FIG. 8, illustrates a building system 200 operating as an industrial electricity generating facility coupled with secondary building systems 200 that can be operably coupled to a plurality or at least one heat exchanger 110 and maintain the purity of the fluid in the heat exchanger portion of the system by utilizing an isolating heat exchanger 204. At least one pump 202 moves fluid from the heat exchanger 110 through the source side of the isolating heat exchanger 204. Simultaneously, at least one pump 202 moves fluid from the building system 200 through the load side of the isolating heat exchanger 204. The fluid from the heat exchanger 110 and the building system 200 exchange heat in the isolating heat exchanger 204 without coming into direct contact preserving the purity of the fluid circulating through the heat exchanger 110. The fluid is recirculate through the heat exchanger 110 in a closed loop. Similarly, the fluid in the building system 200 is recirculated through the building system 200.

In FIG. 8 the area surrounded by the dashed lines 250 is alternative cascaded systems after electricity production.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A ground source heat exchanger, comprising:
    a first fluid conduit, the first fluid conduit having a first arcuate configuration with a first plurality of separate circular passages extending therethrough, the first plurality of separate circular passages being separated by reinforcing bands in the first fluid conduit;
    a second fluid conduit, the second fluid conduit having a second arcuate configuration with a second plurality of separate circular passages extending therethrough, wherein a number of the second plurality of separate circular passages is greater than a number of the first plurality of separate circular passages, the second plurality of separate circular passages being separated by reinforcing bands in the second fluid conduit and the first arcuate configuration of the first fluid conduit and the second arcuate configuration of the second fluid conduit allows the first and second fluid conduits to be coiled for storage and prior to installation of the ground source heat exchanger; and
    an end cap secured to a distal end of the first fluid conduit and a distal end of the second fluid conduit, the end cap fluidly coupling the first plurality of separate circular passages of the first fluid conduit to the second plurality of separate circular passages of the second fluid conduit, the first fluid conduit and the second fluid conduit when secured to the end cap define an expandable internal cavity extending through the ground source heat exchanger;
    a first transition located at a proximal end of the first fluid conduit, the first transition fluidly coupling the first plurality of separate circular passages to an opening of the first transition;
    a second transition located at a proximal end of the second fluid conduit, the second transition fluidly coupling the second plurality of separate circular passages to an opening of the second transition; and
    wherein the first fluid conduit and the second fluid conduit are continuous for a full length of the ground source heat exchanger.

2. The ground source heat exchanger as in claim 1, wherein the first fluid conduit has an outer periphery and the second fluid conduit has an outer periphery, wherein the outer periphery of the first fluid conduit and the outer periphery of the second fluid conduit define an outer periphery of the ground source heat exchanger when the first fluid conduit and the second fluid conduit are secured to the end cap, and wherein the outer periphery of the second fluid conduit is greater than the outer periphery of the first fluid conduit.

3. The ground source heat exchanger as in claim 1, wherein the end cap has an opening extending therethrough the opening being in fluid communication with the internal cavity when the first fluid conduit and the second fluid conduit are secured to the end cap.

4. The ground source heat exchanger as in claim 1, wherein at least the first fluid conduit and the second fluid conduit are formed from high-density polyethylene.

5. The ground source heat exchanger as in claim 1, wherein the first fluid conduit has an inner periphery and the second fluid conduit has an inner periphery each being spaced from each other when the first fluid conduit and the second fluid conduit are secured to the end cap.

6. The ground source heat exchanger as in claim 1, wherein the first arcuate configuration is smaller than the second arcuate configuration.

7. A geothermal system, comprising:
    a plurality of vertical heat exchangers in fluid communication with a heat pump via at least one supply conduit and at least one return conduit, wherein each of the plurality of vertical heat exchangers comprise:.
    a first fluid conduit, the first fluid conduit having a first arcuate configuration with a first plurality of separate circular passages extending therethrough, the first plurality of separate circular passages being separated by reinforcing bands in the first fluid conduit;

a second fluid conduit, the second fluid conduit having a second arcuate configuration with a second plurality of separate circular passages extending therethrough, wherein a number of the second plurality of separate circular passages is greater than a number of the first plurality of separate circular passages, the second plurality of separate circular passages being separated by reinforcing bands in the second fluid conduit and the first arcuate configuration of the first fluid conduit and the second arcuate configuration of the second fluid conduit allows the first fluid conduit and the second fluid conduit to be coiled for storage and prior to installation of the plurality of vertical heat exchangers; and an end cap secured to a distal end of the first fluid conduit and a distal end of the second fluid conduit, the end cap fluidly coupling the first plurality of separate circular passages of the first fluid conduit to the second plurality of separate circular passages of the second fluid conduit, the first fluid conduit and the second fluid conduit when secured to the end cap define an expandable internal cavity extending through a respective one of the plurality of vertical heat exchangers;

a first transition located at a proximal end of the first fluid conduit, the first transition fluidly coupling the first plurality of separate circular passages to an opening of the first transition;

a second transition located at a proximal end of the second fluid conduit, the second transition fluidly coupling the second plurality of separate circular passages to an opening of the second transition; and wherein the first fluid conduit and the second fluid conduit are continuous for a full length of the respective one of the plurality of vertical heat exchangers.

8. The geothermal system as in claim 7, wherein the first fluid conduit has an outer periphery and the second fluid conduit has an outer periphery, wherein the outer periphery of the first fluid conduit and the outer periphery of the second fluid conduit define an outer periphery of a ground source heat exchanger when the first fluid conduit and the second fluid conduit are secured to the end cap, and wherein the outer periphery of the second fluid conduit is greater than the outer periphery of the first fluid conduit.

9. The geothermal system as in claim 7, wherein the end cap has an opening extending therethrough the opening being in fluid communication with the internal cavity when the first fluid conduit and the second fluid conduit are secured to the end cap.

10. The geothermal system as in claim 7, wherein at least the first fluid conduit and the second fluid conduit are formed from high-density polyethylene.

11. The geothermal system as in claim 7, wherein the first fluid conduit has an inner periphery and the second fluid conduit has an inner periphery each being spaced from each other when the first fluid conduit and the second fluid conduit are secured to the end cap.

12. The geothermal system as in claim 7, wherein the first arcuate configuration is smaller than the second arcuate configuration.

13. A method of installing a ground source heat exchanger of a geothermal system below ground level, comprising:

securing a first fluid conduit to a second fluid conduit via an end cap to create the ground source heat exchanger, wherein the first fluid conduit has a first arcuate configuration with a first plurality of separate circular passages extending therethrough, the first plurality of separate circular passages being separated by reinforcing bands in the first fluid conduit and the second fluid conduit has a second arcuate configuration with a second plurality of separate circular passages extending therethrough, wherein a number of the second plurality of separate circular passages is greater than a number of the first plurality of separate circular passages, the second plurality of separate circular passages being separated by reinforcing bands in the second fluid conduit and the first arcuate configuration of the first fluid conduit and the second arcuate configuration of the second fluid conduit allows the first fluid conduit and the second fluid conduit to be coiled for storage and prior to installation of the ground source heat exchanger, and wherein the end cap is secured to a distal end of the first fluid conduit and a distal end of the second fluid conduit, the end cap fluidly coupling the first plurality of separate circular passages of the first fluid conduit to the second plurality of separate circular passages of the second fluid conduit, and wherein the first fluid conduit and the second fluid conduit when secured to the end cap define an expandable internal cavity extending through the ground source heat exchanger, the ground source heat exchanger including a first transition located at a proximal end of the first fluid conduit, the first transition fluidly coupling the first plurality of separate circular passages to an opening of the first transition, the ground source heat exchanger also including a second transition located at a proximal end of the second fluid conduit, the second transition fluidly coupling the second plurality of separate circular passages to an opening of the second transition; and wherein the first fluid conduit and the second fluid conduit are continuous for a full length of the ground source heat exchanger;

inserting the ground source heat exchanger into a borehole; and filling the expandable internal cavity with grout after the ground source heat exchanger has been inserted into the borehole, wherein the first fluid conduit and the second fluid conduit expand outwardly from each other as the expandable internal cavity is filled with grout thereby increasing a distance between the first fluid conduit and the second fluid conduit and maximizing contact of outer surfaces of the first fluid conduit and the second fluid conduit with a wall of the borehole.

* * * * *